United States Patent Office 3,163,662
Patented Dec. 29, 1964

3,163,662
OXIDATION OF 19-HYDROXY-STEROIDS
Johannes Kloosterman, Oss, Netherlands, assignor to Organon Inc., West Orange, N.J., a corporation of New Jersey
No Drawing. Filed Aug. 12, 1963, Ser. No. 301,653
Claims priority, application Netherlands, Sept. 19, 1962, 283,418
1 Claim. (Cl. 260—397.3)

The invention relates to the preparation of 10-formyl-steroids by oxidation of 19-hydroxy-steroids with chromium trioxide in the presence of a solvent.

For the preparation of the increasingly important group of 19-nor-steroids the fairly general method was applied until recently of aromatization of $\Delta^{1,4}$-3-keto-10-methyl-steroids by heating, followed by conversion of the resulting $\Delta^{1,3,5(10)}$-3-hydroxy-steroids into $\Delta^4$-3-keto-19-nor-steroids by reduction.

A more up-to-date and cheaper method consists in that 19-hydroxy-steroids are converted into 19-nor-steroids by splitting off of the angular hydroxymethyl group by treatment with alkali.

These 19-hydroxy-steroids can be obtained by biochemical or microbiological oxidation starting from the corresponding 10-methyl-steroids, or by oxidation of 6β-hydroxy-10-methyl-steroids with a metal acylate, followed by the opening of the 6,19-oxido ring of the resulting 6,19-oxido-steroids with zinc.

From an article of Nikoichi Hagiwara et al. in Chem. Pharm. Bull. 8, 84–85 (1960) it appears that, starting from a 19-hydroxy-steroid the yield of the desired 19-nor-steroid can be raised considerably if the 19-hydroxy-steroid is first oxidized to the corresponding 19-aldehyde compound (10-formyl compound), whereupon this compound is treated with a strong base.

The said oxidation is usually performed by means of chromium trioxide in the presence of a solvent, for which an organic base, such as pyridine, may be applied, forming a complex between the chromium trioxide and the pyridine, or in the presence of a ketone, such as acetone.

According to the process described in the non-prepublished Netherlands patent application Nr. 283,417 a halogenated aliphatic hydrocarbon, such as chloroform or methylene chloride, is preferably applied as solvent.

The oxidation of a 19-hydroxy-steroid, as well as that of another hydroxy-steroid, is performed in air as described in the literature. One might imagine that the oxidation reaction would proceed easier and/or better if the air should be replaced by oxygen.

Contrary to this expectation it has been most surprisingly found now that the yield of the oxidation of a 19-hydroxy-steroid with chromium trioxide rises considerably if the reaction is performed in the absence of oxygen. Usually the air in which the process was performed by the known methods, is replaced by nitrogen, but of course other non-oxygen containing gasses can also be used.

The oxidation of the 19-hydroxy-steroid can be performed further by the known method. The chromium trioxide is usually applied in a solution of sulphuric acid diluted with water, usually in concentrations of 2–10 N.

The invention is illustrated further by the following examples.

Example I

Ten gm. of $\Delta^4$-3,17-diketo-19-hydroxy-androstene are dissolved in 100 ml. of dimethylformamide, whereupon in nitrogen atmosphere 15 ml. of a solution of 8 N chromic acid are added dropwise. Next the mixture is stirred for 5 hours at 30° C., after which a small quantity of a solution of sodium sulphite is added to remove the excess of chromic acid, and next water. The precipitate is sucked off, washed with water and crystallised from ethanol to obtain the $\Delta^4$-3,17,19-triketo-androstene in 82% yield. The yield of this reaction performed in the presence of air was 60%.

Example II

To a solution of 10 gm. of $\Delta^4$-3,17-diketo-19-hydroxy-androstene in 100 ml. of methylene chloride are added in nitrogen atmosphere 12, 2 ml. of an aqueous solution of 8 N chromic acid. The mixture is stirred for 3 hours at 40° C., while constantly bubbling through nitrogen, after which the methylene chloride layer is separated, washed until neutral and evaporated to dryness. The residue is crystallised from ethanol to obtain the $\Delta^4$-3,17,19-triketo-androstene in 90% yield.

Example III

To a solution of 5 gm. of 19-hydroxy-testosterone-benzoate in 120 ml. of chloroform are added in nitrogen atmosphere at 35° C. 10 ml. of a solution of 8 N chromium trioxide, after which the mixture is stirred for 3 hours at 35° C. Next the reaction mixture is poured into 500 ml. of a solution of 1% $Na_2SO_3$, whereupon the precipitate is filtered off, washed with water and dried to obtain the 19-oxo-testosterone-17-benzoate in 93% yield.

Example IV

Two grams of $\Delta^4$-3,20-diketo-19-hydroxy-pregnane are dissolved in 60 ml. of chloroform, after which nitrogen is bubbled through the solution. Next 6 ml. of an aqueous solution of 8 N chromic acid are added to the reaction mixture in nitrogen atmosphere, at 40° C., whereupon the mixture is stirred for 4½ hours at 40° C. Then the mixture is treated further in accordance with the process described in Example I to obtain the $\Delta^4$-3,19, 20-trioxopregnene in 91% yield.

In the same manner the $\Delta^5$-3,17,19-trihydroxy-androstene-3,17-diacetate has been converted into nitrogen atmosphere into the corresponding 19-oxo compound in 90% yield.

I claim:

Method for the preparation of a 10-formyl-steroid selected from the group consisting of the androstane and pregnane series comprising oxidizing a 19-hydroxy-steroid selected from the group consisting of the androstane and pregnane series with chromium trioxide in the presence of a solvent and in the absence of oxygen.

References Cited by the Examiner
UNITED STATES PATENTS
3,117,143    1/64   Sollman _____ 260—397.4

LEWIS GOTTS, Primary Examiner.